United States Patent

[11] 3,549,030

[72] Inventors Samuel J. Coughran, Jr.
 Cedartown, Ga.;
 Harvey D. Burkhalter, Ruston, La.
[21] Appl. No. 782,688
[22] Filed Dec. 10, 1968
[45] Patented Dec. 22, 1970
[73] Assignee Rome Industries, Incorporated
 Cedarton, Ga.
 a corporation of Georgia

[54] LOAD EJECTING VEHICLE
 9 Claims, 10 Drawing Figs.
[52] U.S. Cl. .................................................. 214/85,
  280/145
[51] Int. Cl. ................................................... B60p 1/48
[50] Field of Search ......................................... 214/82,
 85.1, 85.5, 85; 280/143, 145; 296/43, 14; 105/382,
  388

[56] References Cited
 UNITED STATES PATENTS
 529,583  11/1894  Beatty ......................... 214/82X
 547,095  10/1895  Sutcliffe et al. .............. 214/82X
 1,088,100  2/1914  Saunders et al. .............. 214/82
 2,754,769  7/1956  Yorston et al. ................ 280/145X
 3,021,970  2/1962  Bigge et al. .................. (214/85.1)
 3,341,221  9/1967  Kane et al. ................... 280/145

Primary Examiner—Albert J. Makay
Attorney—Newton, Hopkins & Ormsby

ABSTRACT: A log-transporting vehicle having fixed stakes along one side of the frame and pivoted stakes along the opposite side of the frame. The pivoted stakes are attached for pivotal connection at a point below the cargo deck and an off-loading ramp cable normally hangs slack between the upper ends of the stakes but when the pivoted stakes are swung down to the ground, the ramp cable is stretched taut to lift and roll the load off the vehicle. Each ramp cable is anchored at the upper end of a fixed stake and passes under the load and thence over a pulley at the upper end of a pivoted stake and thence downwardly to pass beneath a second pulley on the pivoted stake and then issues horizontally to pass over a pulley on the vehicle frame above the pivot point of the stakes and is deadended against a resilient stop. The compound action of the placement of the stake pivot points and the disposition of the second and fixed pulleys assures tensioning of the ramp cables in the off-loading position of the stakes.

A binder cable arrangement involves a cable deadended to the upper end of the pivoted stakes and which passes over the load and down to a pulley fixed adjacent the lower end of the fixed stakes, thence up and over a second pulley and then downwardly to an anchor point. The second pulley is movably carried by a piston and cylinder arrangement to tension the load-binding cable.

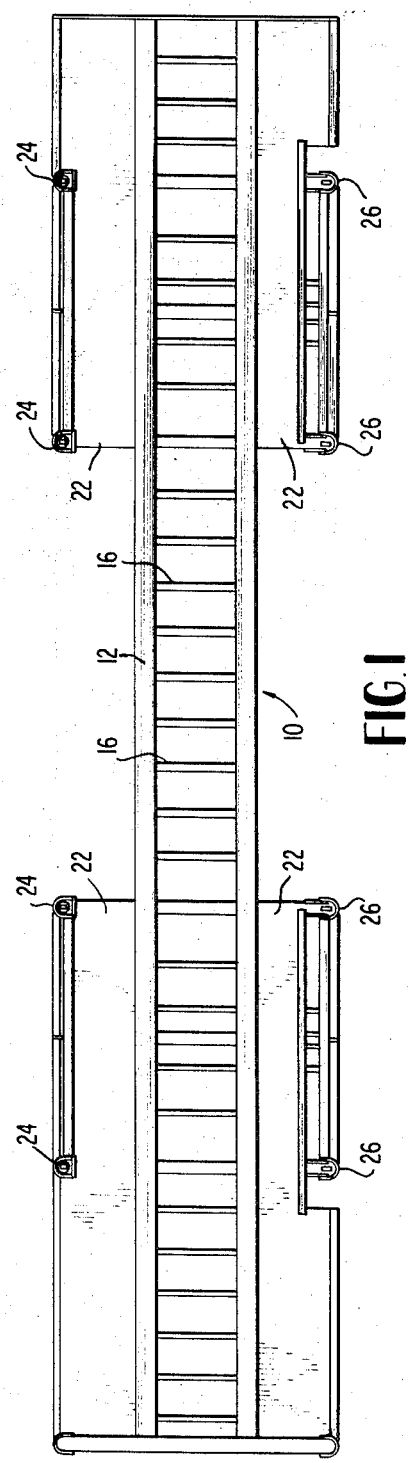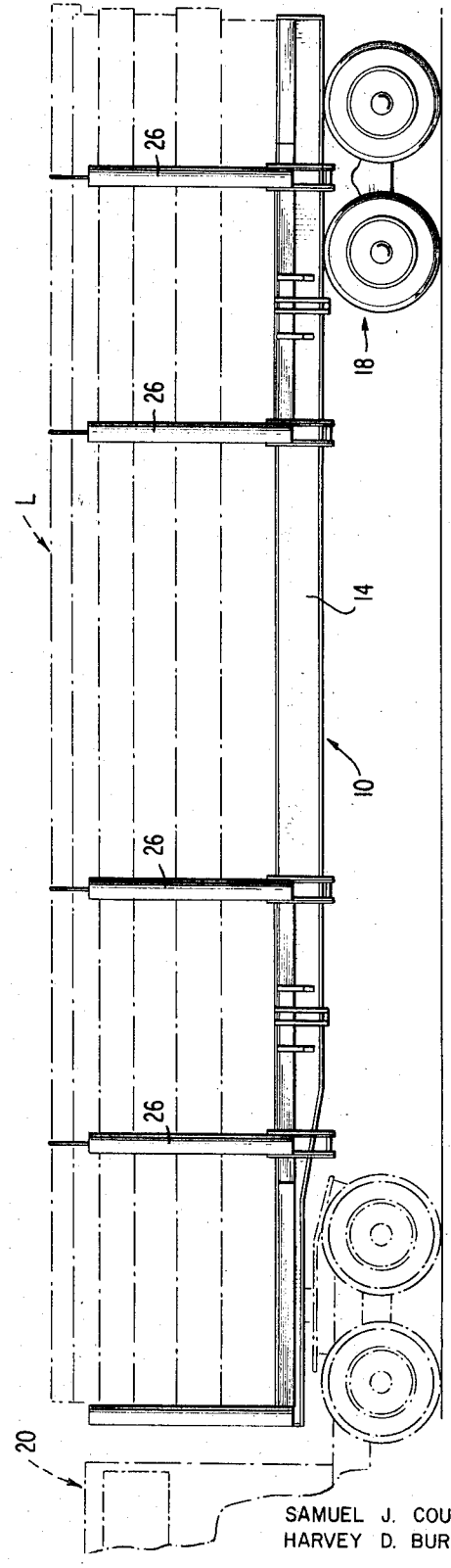

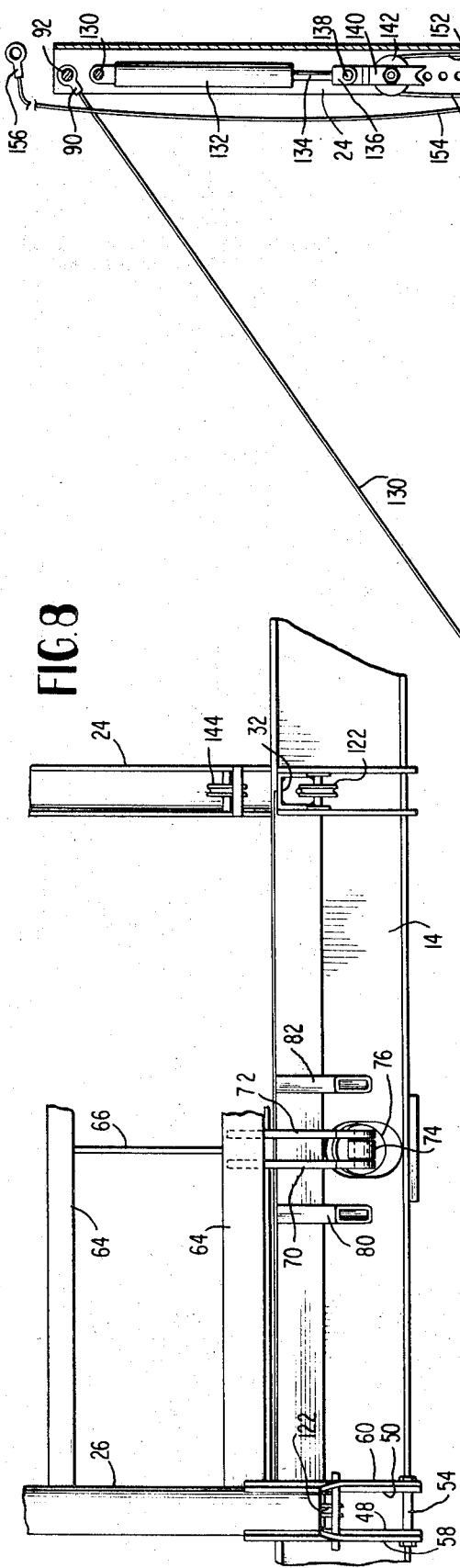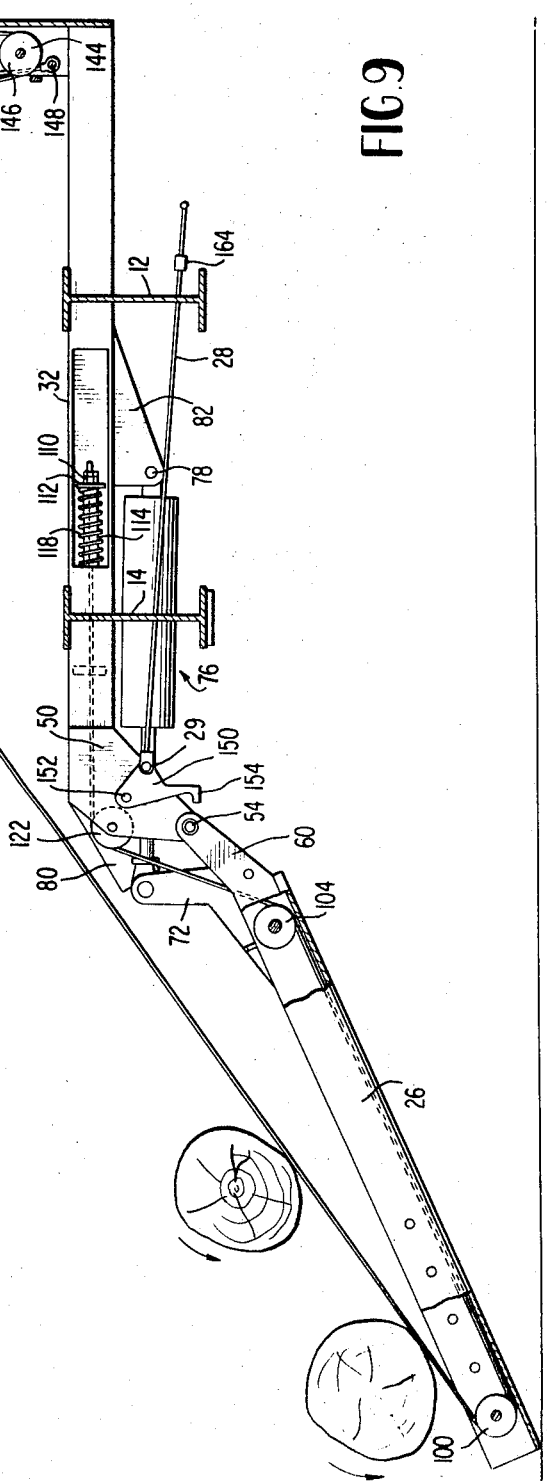

LOAD EJECTING VEHICLE

BACKGROUND OF THE INVENTION

In order to retain a competitive posture, it is essential in contemporary logging operations to minimize the handling time of the logs inclusive of the handling thereof from the gathering point to the point of destination. It is essential that the off-loading of the logs from the vehicle which carries them be as simple and automatic as possible. Conventional logging vehicles employ pivoted stakes or stake sockets along one side of the vehicle bed which are normally latched in place and upon arrival at the point of destination the operator trips the latches and the weight of the logs swings the stakes to allow the logs to roll off the side of the vehicle. Ordinarily, however, some of the logs remain on the vehicle bed and require manual removal.

The process of binding the load on the vehicle ordinarily involves manually operated load binding devices which the operator must individually place and manipulate to achieve the requisite binding action.

BRIEF SUMMARY OF THE INVENTION

The present invention is directed to an improved system for binding and off-loading logs and similar articles from a load-handling vehicle. Essentially, the present invention involves the utilization of pivoted load-retaining means along one side of the vehicle bed which are power operated between a normal upstanding position and downwardly swung position reaching to the ground surface. A series of ramp cables extend between the upper ends of the pivoted load-retaining means and fixed load-retaining means positioned along the opposite side of the vehicle bed. The ramp cables, when the pivoted retaining means is in its normal position, hang limp to extend downwardly along the inner sides of the retaining means and across the vehicle bed to accept the load of logs but when the pivoted retaining means is swung downwardly into ground engaging position the ramp cables are stretched taut and form an inclined ramp which lifts and spills the load off the vehicle.

The pivoted retainer means, being in the form of stakes, are pivoted at their lower ends at a point below the vehicle bed and the ramp cables are trained over a series of pulleys such that the cables are stretched taut and are tensioned in response to the downward swinging of the stakes. A pulley carried by the stakes operates in conjunction with a pulley carried by the bed to increase this action and one end of the ramp cable in each case is dead-ended by a coil spring member to effect proper tensioning of the ramp cables when in their operative positions.

The load-retaining means according to this invention involves a cable and pulley arrangement associated with the fixed stakes. One of the pulleys is connected to a piston and cylinder arrangement for retraction thereby to effect the binding action, the binding cables being passed over the load and dead-ended on the pivoted stakes.

BRIEF DESCRIPTION OF THE DRAWING FIGURES

FIG. 1 is a plan view of a vehicle according to the present invention;

FIG. 2 is a side elevational view of the assembly shown in FIG. 1;

FIG. 8 is a side elevational view of the assembly shown in FIGS. 6 and 7; and

FIG. 9 is a view similar to FIG. 3 but showing the disposition of component parts in the off-loading position.

DETAILED DESCRIPTION OF THE INVENTION

Figure 3:
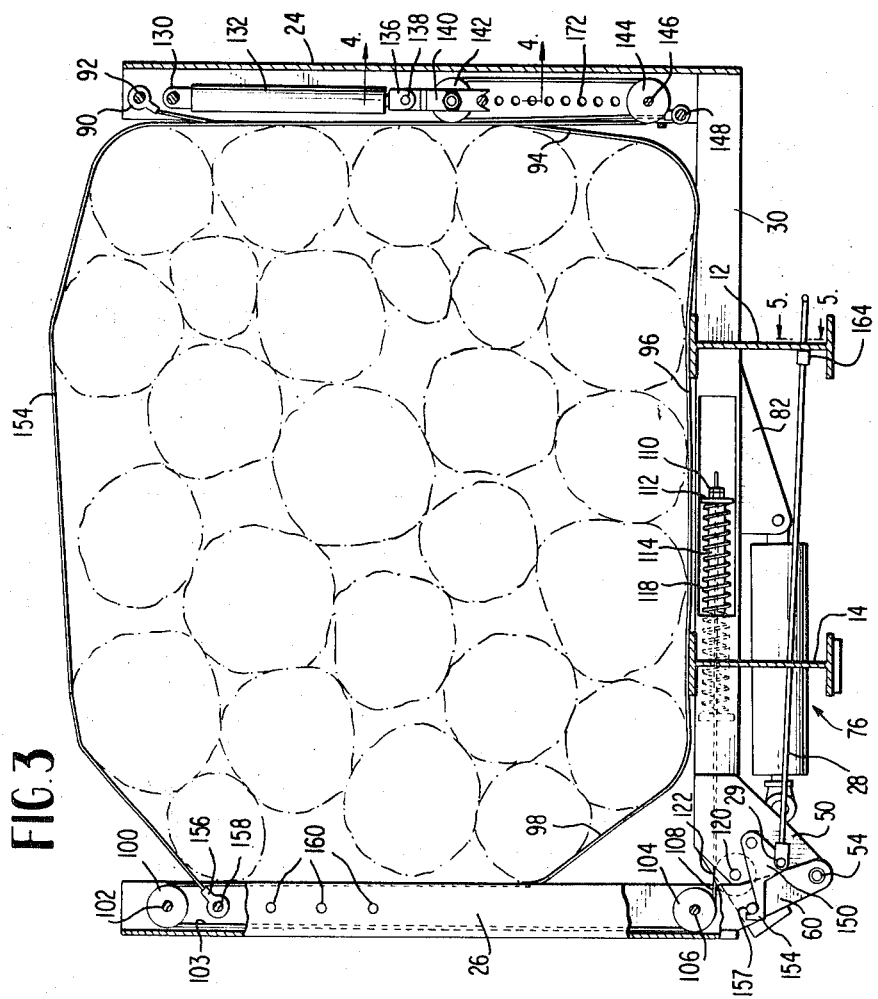
FIG. 3 is an enlarged transverse section taken through the vehicle chassis and partly broken away to illustrate the disposition of the ramp and load binding cables.

With reference now more particularly to FIGS. 1 and 2, the reference character 10 indicates in general the chassis or undercarriage of a vehicle which may be in the form of a trailer, as shown, or may be the integral rear portion of a conventional truck body, as may be desired and as will be understood by those skilled in the art.

The chassis includes longitudinal frame members 12 and 14 having suitable cross bracing members such as those indicated by the reference character 16. In the illustrative embodiment shown, the rear portion of the vehicle is provided with ground-engaging wheels indicated generally by the reference character 18 and its forward portion is provided with a conventional fifth wheel coupling by means of which it is attached to a tractor vehicle indicated generally by the reference character 20 and illustrated in dashed lines since the particular type of vehicle with which the present invention is associated insofar as the means for powering and steering it are concerned form no part of the present invention.

As will be apparent later on, forward and rear portions of the vehicle are provided with laterally outwardly projecting extensions of the cross bracings and welded or otherwise suitably secured thereto are the safety plate or floor elements such as those indicated by the reference character 22, the purpose of which will also be apparent presently. As will be understood by those skilled in the art, along one side of the vehicle chassis are a series of upstanding fixed retaining stakes 24 while disposed along the opposite side are pivoted retaining stakes 26. To this general extent, the present invention follows conventional practice wherein it will be appreciated that a load of logs L shown in phantom lines in FIG. 2 is normally retained between the fixed and pivoted stakes for transport of the load to a desired destination point whereat the pivoted stakes 26 are released and allowed to swing downwardly so as to off-load the logs such that they spill over the side of the vehicle. In accordance with the present invention, however, two sets of flexible tension members such as cables are utilized, one set of which form off-loading ramps for the load and the other of which form means for binding the load tightly upon the truck.

Figure 7:
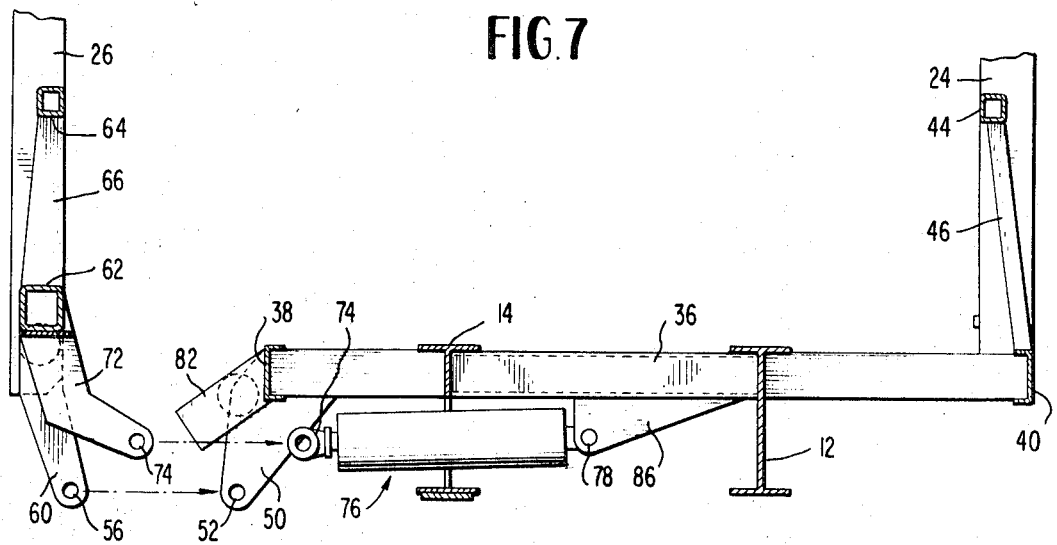
FIG. 7 is a transverse section taken substantially along the plane of line 7–7 in FIG. 6 and further showing details of the construction employed.
Figure 6:
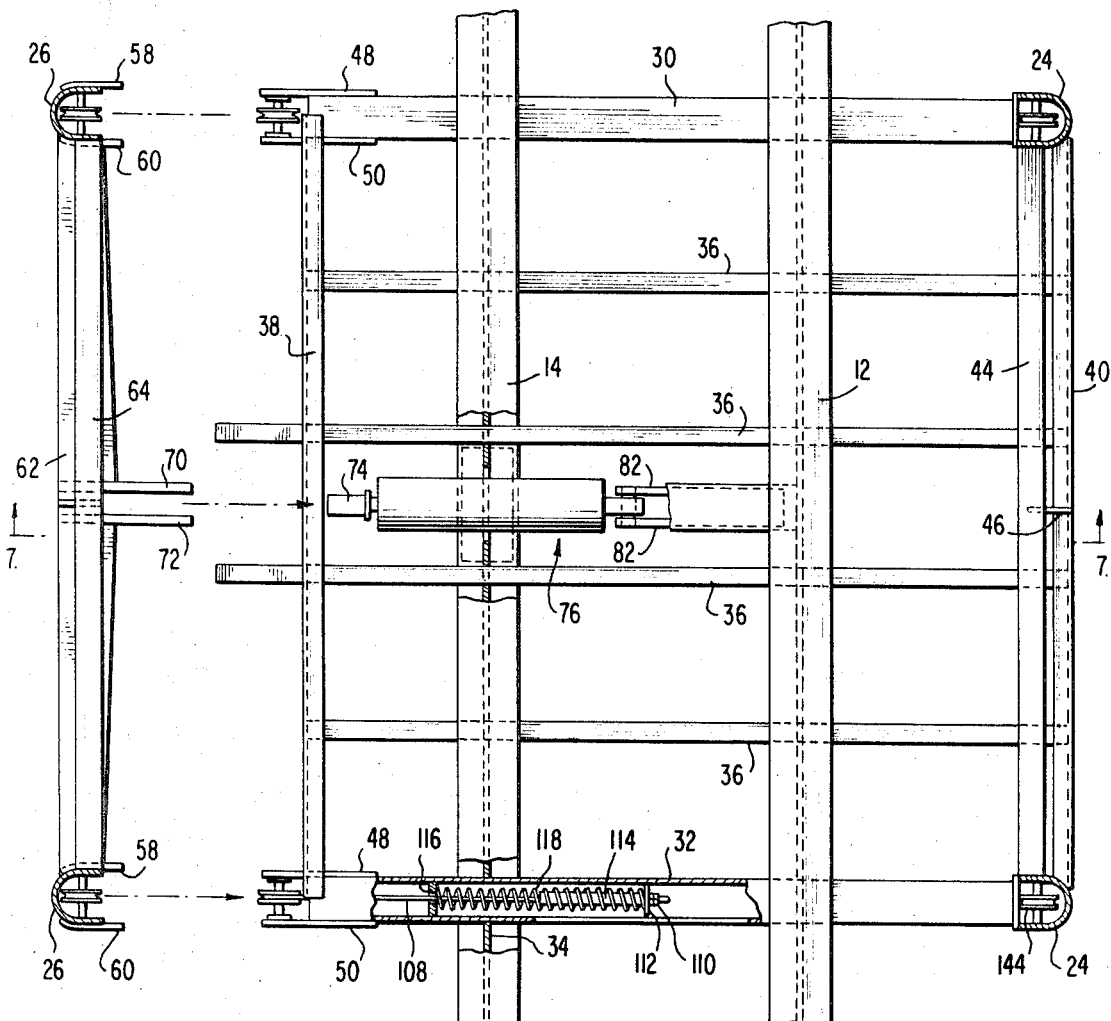
FIG. 6 is an enlarged plan view showing a section of the vehicle chassis in the region of one of the pivoted stake assemblies and showing same in exploded relation with respect to the chassis.

With reference to FIGS. 6—8 inclusive, inverted channel-shaped main cross frame members 30 and 32 are passed through and secured within suitable openings in the webs 34 of the I-section main frame elements 12 and 14 and similar constructions are employed for the intermediate bracing elements 36 so that they provide outboard extensions upon which the plates 22 previously described are supported. Longitudinal bracing elements 38 and 40 are provided substantially as is shown to rigidify the outboard ends of the outboard extensions and at one side of the chassis, the fixed stakes 24 are secured in upstanding relationship to this subframe structure, such stakes being interconnected by suitable bracing element 44 having an intermediate supporting leg portion 46 extending downwardly therefrom for connection to the outboard bracing element 40 substantially as may be seen in FIGS. 6 and 7.

At the opposite side of the subframe, a pair of depending mounting plates 48 and 50 are secured to the corresponding end of the main cross frame members 30 and 32, the lower ends of which plates are apertured as indicated by the reference character 52 in FIG. 7 for receiving the pivot pins 54, one of which is shown in FIG. 8 and which pin also passes through the openings 56 in the depending extensions 58 and 60 of each of the pivoted stake members 26. These stake members are interconnected by a pair of bracing elements 62 and 64 interconnected at intermediate portions thereof by the bracing leg 66, all in such fashion as to lend sufficient rigidity to the assemblage to withstand the forces imposed thereon by the loads as will be clearly evident to those skilled in the art.

The lower brace member 62 extending between the pivot stakes 26 is provided with a pair of depending arms 70 and 72 which are apertured at their lower ends as indicated by the reference character 74 and are adapted to straddle the piston rod eye 74 of an hydraulic piston and cylinder assembly indicated generally by the reference character 76, which assembly is pivotally attached as at 78 to a suitable pair of depending gusset plate elements 82, substantially as is shown in FIG. 7. A suitable coupling pin, of course, connects the piston rod eye 74 to the arms 70 and 72. To protect the piston assembly, downwardly inclined bumper elements 80 and 82 are provided on either side of the piston rod. Associated with each pair of fixed and pivoted stakes 24 and 26 is an unloading cable which, as may be seen in FIG. 3, is dead-ended at one end through the medium of an eye 90 to a suitable pin 92 fixed to the upper end of the associated fixed stake member 24. For convenience, both the fixed and pivoted stakes may be of U-shape configuration conveniently to receive the assemblages such as the pins 92 and other mechanisms hereinafter described. The unloading cable normally lies slack within the space between the stakes 24 and 26 as is shown in FIG. 3, first extending downwardly in the portion 94 thereof on the inner side of the fixed stake 24, across the bed in the portion 96 thereof and thence upwardly in the portion 98 thereof to pass over a pulley 100 journaled on a pin 102 carried adjacent the upper end of the associated pivoted stake 26. The ramp cable then passes downwardly in the portion 103 thereof within the pivoted stake 26 to pass beneath the pulley 104 secured in journaled relation within the pivoted stake 26 by means of a pin 106 adjacent the relation within the pivoted stake lower end of such stake and then the cable passes in the portion 108 thereof horizontally inwardly to be dead-ended at 110 against a spring seat plate 112 located within the corresponding main cross frame member 30 or 32 as the case may be. The inner side of this spring seat plate 112 carries a stop plunger member 114 which is adapted to bottom against a fixed spring seat plate 116 [see particularly FIG. 6] to limit compression of the spring 118 which is interposed between the two plates 112 and 116. Located just inwardly of the pulley 104 and fixed between the plates 48 and 50 by a journal pin 120 is a stationary pulley 122. Thus, due to the length of the arc swung by the pivoted stakes 26 due to their pivotal connection at 54 below the level of the chassis bed, in conjunction with the two pulleys 104 and 122, when the pivoted stakes 26 are forced downwardly under the action of the piston and cylinder assembly 76 to their off-loading ground-engaging positions, as shown in FIG. 9, the unloading cable will be stretched taut and tensioned to form the off-loading ramp 130 as is illustrated in FIG. 9. The effective length of the unloading cable is adjusted by means of its anchoring mechanism 110 such that, under the action of the spring 118, a predetermined amount of tension will be present in the cables when the pivoted stakes 26 are in the ground-engaging position. In an operative embodiment of the invention, the cables are tensioned to 2000 lbs. when in the position shown in FIG. 9 and approximately at 650 lbs. when the stakes 26 are in horizontal outwardly extended positions. It will be appreciated, of course, that due to the resiliency of the springs 118, the weight of the logs will tend to cause the cables to sag somewhat while the logs are still thereon but the cables are constantly attempting to obtain the position shown in FIG. 9 during the off-loading operation so that the off-loading of the logs is a progressive and orderly function. In view of the fact that many of the logs will roll off under their own power as soon as the stakes 26 are swung aside, the ramp or unloading cables are most effective in assuring the off-loading of the last few logs which normally remain in the bed of the truck and which ordinarily require manual off-loading.

Figure 3A:
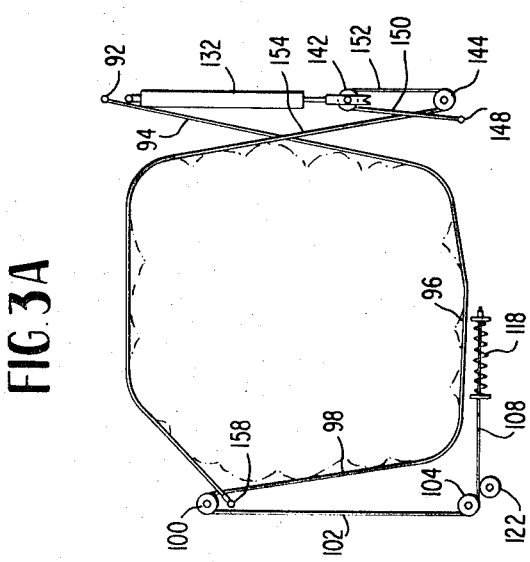
FIG. 3A is a diagrammatic view illustrating the cable system shown in FIG. 3.

Each of the fixed stakes 24 is provided with a mounting pin 130 which pivotally mounts a piston and cylinder assembly 132, the piston rod 133 of which is provided with a clevice 136 pinned as at 138 to a frame 140 carrying a pulley 142. A similar pulley 144 is fixedly carried by the stake 24 by means of a pin 146 substantially as is shown in FIG. 3 and 9. One end of a binding cable is dead-ended as at 148 adjacent each pulley 144 and the cable passes therefrom in the portion 150 thereof upwardly over the pulley 142, and thence back downwardly in the portion 152 thereof to pass around and under the pulley 144 and to issue therefrom in the portion 154 which is adapted to be thrown over the load and dead-ended as by the eye 156 and associated removable pin 158 at any one of a plurality of positions along the length of the associated pivot stake 26 by passing the pin 158 through a desired set of openings 160 in the stake 26. FIG. 3A shows in diagrammatic form the two cable assemblies associated with each opposite pair of fixed and pivoted stakes 24 and 26.

Figure 5:
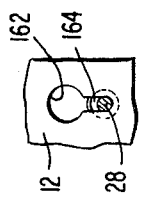
FIG. 5 is an enlarged view illustrating the lock retainer for the pivoted stakes.
Figure 4:
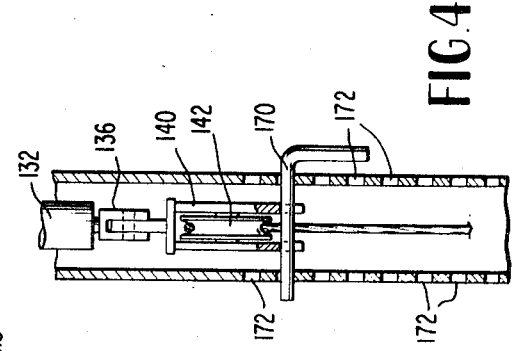
FIG. 4 is an enlarged vertical view taken substantially along the plane of line 4–4 in FIG. 3 showing details of the binding cable tensioning mechanism and illustrating the locking device associated therewith.

A latching lever 150 as may be seen in FIGS. 3 and 9 is associated with each of the plates 50, being pivotally mounted thereto as by the pins 152 and the hook ends 154 of these levers are adapted to cooperate with latch pin elements 157 carried by the depending arm portions 60 of the pivoted stakes 26 so that, when the parts are in position shown in FIG. 3, the stakes 26 are held in their normal or upright position by this latch mechanism. To operate the latch, a suitable rod 28 is pivoted as at 29 to the associated lever 150 and this rod passes through the webs of the main frame members 12 and 14, the former being provided with a keyhole opening 162 as is shown in FIG. 5 to allow the stop collar 164 on the rod 158 to be passed through the web of the member 12 and be disposed in the fashion indicated in FIG. 3 so as to lock the latch assembly in place. During actual transportation, the latch assemblies 150, 157, are not solely responsible for maintaining the pivoted posts 26 in proper normal upstanding position inasmuch as this function is largely taken over by the binding cable assemblies. After loading, the binding cables are thrown over the load and dead-ended by the pins 158 at suitable positions in the pivoted stakes 26 and the piston and cylinder assembly 132 in each case is actuated to tension the binding cables by movement of the pulley 142 in the upward direction. When the binding cables are sufficiently tensioned, L-shaped holding pin elements 170 as shown in FIG. 4 are inserted through one of a pair of aligned apertures 172 provided in the legs of the channel shaped fixed stake members 24 to form an abutment stop for the notched end portions of the frame 140 carrying the pulley 142, substantially as is shown. Thereafter, the pressure on the cylinder assemblies 132 may be relieved so that the binding tension in the binding cables is retained by the pins 170.

When off-loading, the cylinder assemblies 132 are actuated to relieve pressure on the pins 170 which are then withdrawn and when the binding cables are relaxed, their anchoring pin 156 removed, and the cables are thrown over to one side as is illustrated in FIG. 9, the rods 28 are actuated to release the latch levers 150 to allow the load to swing the pivoted stakes 26 outwardly against the action of the cylinders 76 which terminally may be actuated in such fashion as to urge the stakes 26 to the ground-engaging position shown in FIG. 9 whereat the cable portions 130 act as ramps to assure the off-loading of the last logs on the truck.

The present invention, therefore, is well adapted to carry out the objects and attain the ends and advantages mentioned as well as others inherent therein. While the presently illustrative embodiment of the invention is given for the purpose of disclosure, numerous changes in the details of construction and arrangement of parts may be made which will readily suggest themselves to those skilled in the art and which are encompassed within the spirit of the invention and the scope of the appended claims.

We claim:

1. In a vehicle of the type having a load-receiving chassis, first upstanding retaining means supported along one side of said chassis and second upstanding retaining means supported along the other side of said chassis, said first retaining means being pivotally supported on said chassis for pivotal movement about an axis substantially parallel to the side of said chassis and for movement between a normal upstanding position and a downwardly swung position extending away from said chassis side for off-loading the vehicle, the improvement comprising:

means operatively connected to said first retaining means for urging said first retaining means between said upstanding and downwardly swung positions;

flexible tension means operatively connected to and extending between said first and second retaining means, said tension means being of a length to pass in relatively slack condition beneath a load on said chassis when said first retaining means is in said normal upstanding position; and means for tensioning said flexible tension means in response to downward swinging movement of said first retaining means to form a ramp for off-loading the load.

2. The improvement in a vehicle according to claim 1 wherein said flexible tension means comprises a plurality of cables extending between the upper ends of said first and second retaining means at longitudinally spaced regions along said chassis.

3. The improvement in a vehicle according to claim 1 wherein said chassis is provided with a load-carrying bed and said first retaining means is pivotally connected to said chassis at a point below the load-carrying bed thereof.

4. The improvement in a vehicle according to claim 2 and including means for releasably locking said first retaining means in upstanding position.

5. The improvement in a vehicle according to claim 4 and including resilient tensioning means interposed between one end of said cables and said chassis.

6. The improvement in a vehicle according to claim 4 and including means for assisting in maintaining said first retaining means in upstanding position.

7. The improvement in a vehicle according to claim 6 wherein said means for assisting includes a binding cable passing over the load and being tensioned between said first and second retaining means.

8. The improvement in a vehicle according to claim 7 and including means for varying the tension on said binding cable.

9. The improvement in a vehicle according to claim 7 and further characterizes in that said means for assisting includes a plurality of binding cables positioned at longitudinally spaced regions along said chassis.